Patented June 10, 1947

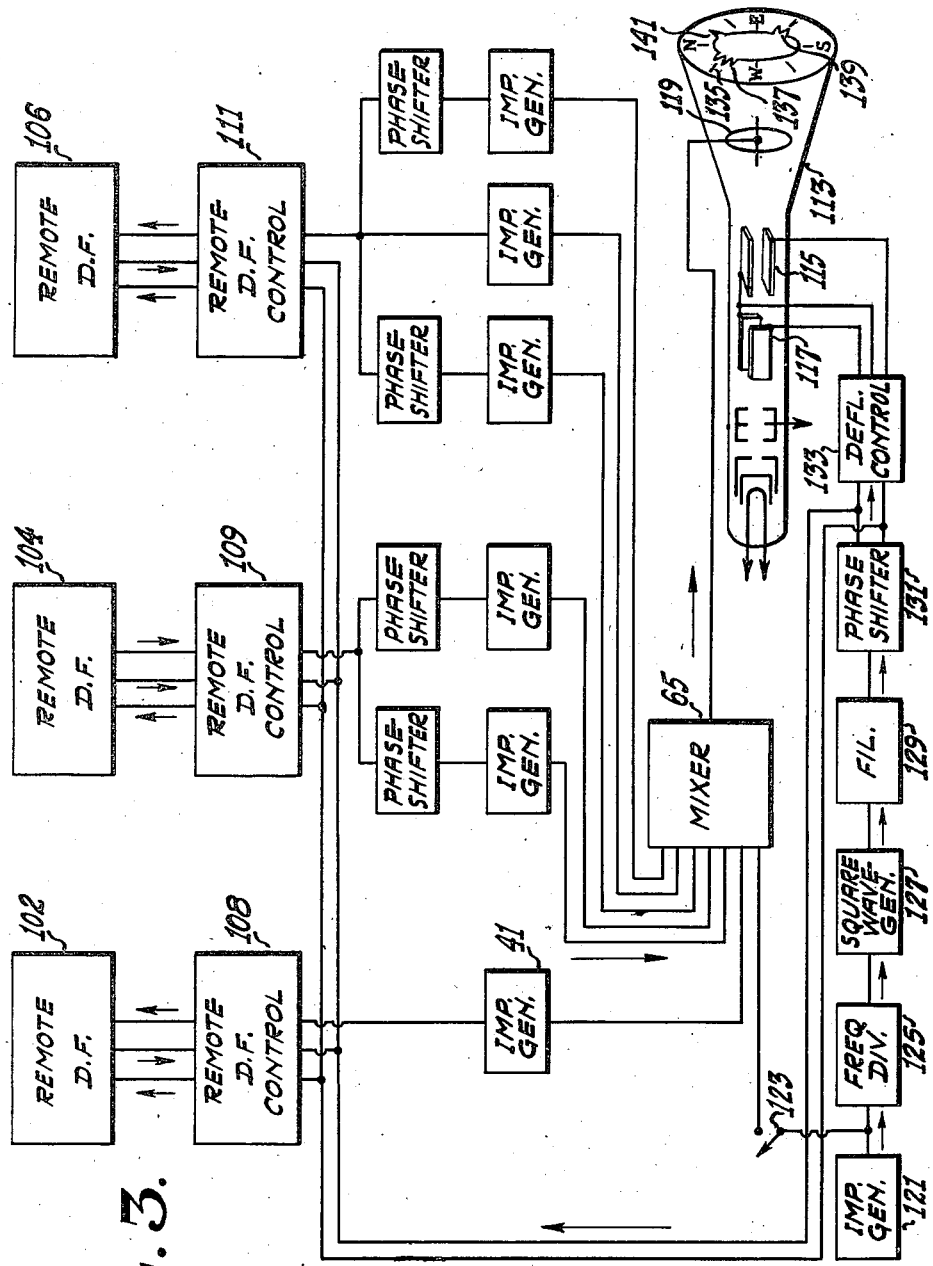

2,422,109

UNITED STATES PATENT OFFICE 2,422,109

RADIO DIRECTION FINDING

David G. C. Luck, Merchantville, N. J., assignor to Radio Corporation of America, a corporation of Delaware Application September 11, 1942, Serial No. 457,967

4 Claims. (Cl. 250—11)

This invention relates to radio direction finding, and more particularly to a system for recording automatically the time and origin of radio transmissions at a selected frequency. A system of this type is applicable, for example, in the operation of aircraft, when ground personnel are to be kept informed of the positions of aircraft in flight without special effort on the part of the pilots. Generally a common frequency will be used for transmissions made by any of a group of aircraft, so that bearings for each member of the group may be taken without retuning. Nevertheless, when bearings are taken or recorded manually, some may be missed by the ground operator, due to the fact that he is occupied with other duties, and transmissions from aircraft in flight are customarily very brief.

A mechanically spinning antenna type of direction finder may be adapted to record the bearings of received signals. The scanning drum of a facsimile recorder is mounted on an extension of the antenna shaft. The received signals are modulated by the rotation of the directive antenna. A series of current impulses having, for example, the phase of the modulation maxima may be derived by applying the modulated signal to a peak amplifier or equivalent device. The impulses are applied to the printer circuit of the facsimile recorder, producing a series of dots whenever a signal is received. The position of the dots along the scanning line of the recorder will indicate the azimuth of arrival of the signal.

For position finding, two intersecting bearings, from differently located receivers, are required, and three are desirable to provide a check. All three receivers should be controlled from a central point, and present their indications at that point.

Accordingly, it is an object of this invention to provide an improved method of and means for recording bearings.

Another object is to provide a system for recording automatically the bearings of a transmitter with respect to a plurality of differently located receivers.

A further object is to provide an improved method of and means for actuating a facsimile recorder in response to the outputs of a plurality of remote automatic direction finders, producing simultaneous but readily distinguishable records upon a common medium.

Figure 1:
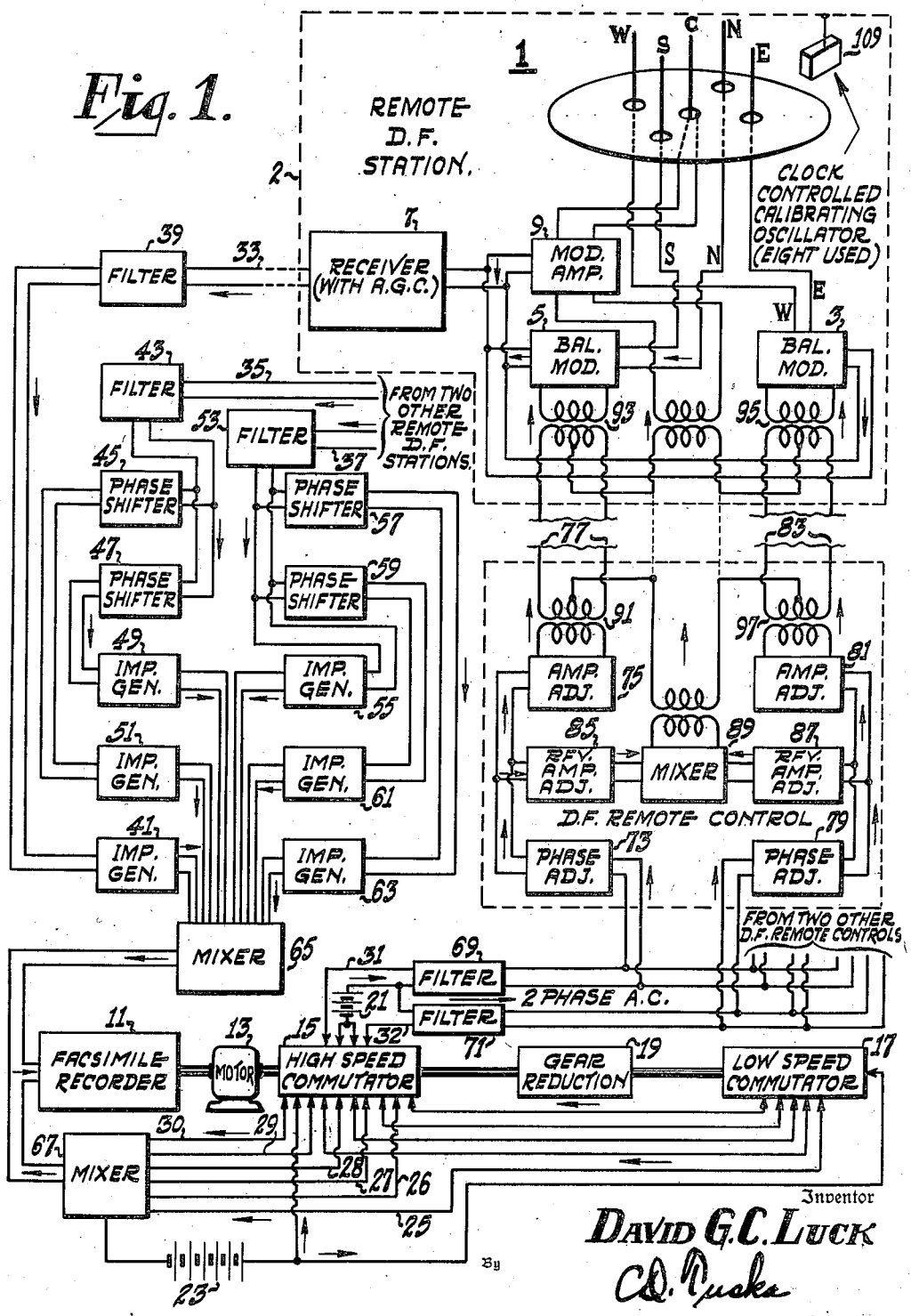
Figure 2:
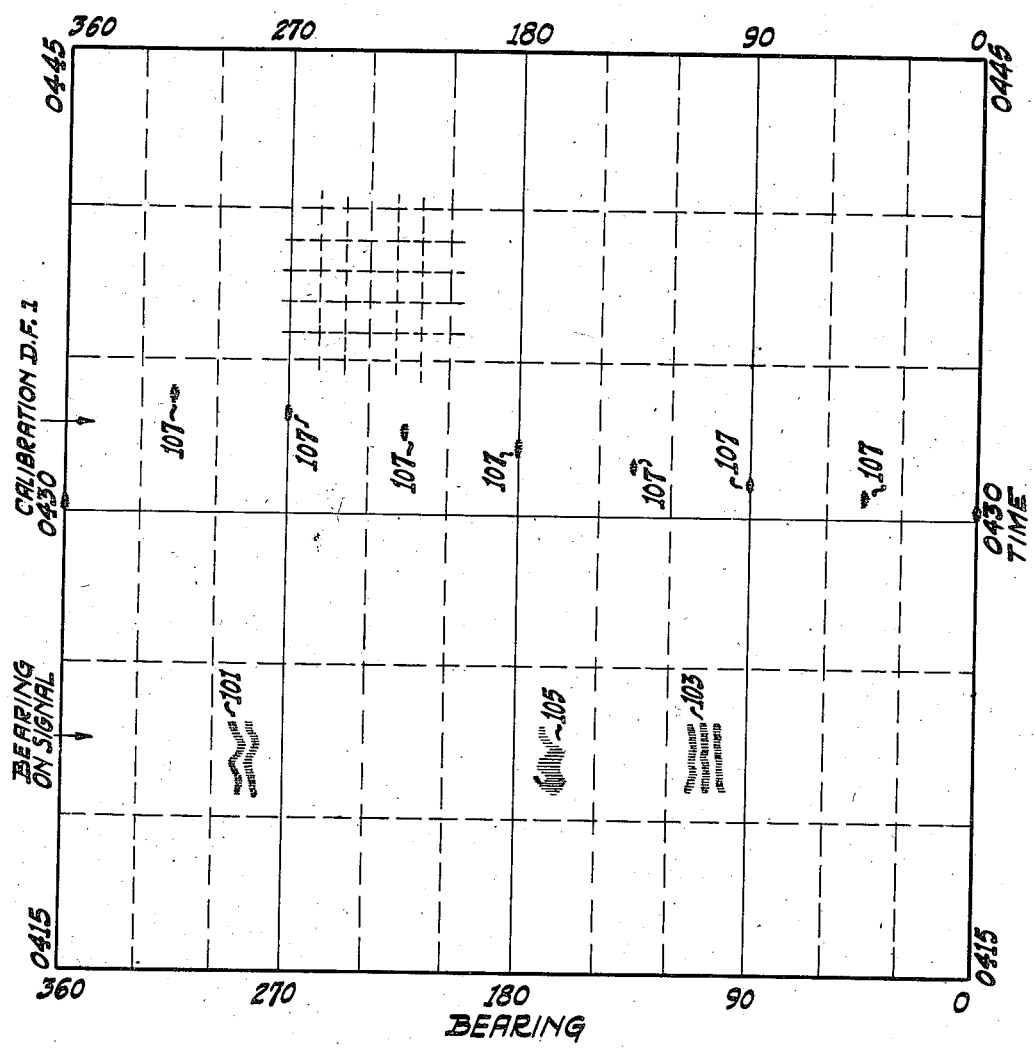

These and other and incidental objects will become apparaent to those skilled in the art upon consideration of the following description, with reference to the accompanying drawings, of which Fig. 1 is a schematic diagram of a system embodying the invention; Fig. 2 is a representation of a portion of a typical record produced by the system of Fig. 1; and Fig. 3 is a block diagram of a modification of the invention.

Referring to Fig. 1, a remote direction finder station 1 is shown, separated from the remainder of the drawing by a dashed line 2. Two other identical stations, not shown, are placed at other locations and connected to a control station through telephone or similar lines in the same manner as the station 1. Each direction finder comprises a plurality of stationary antennas N, E, S and W, connected through balanced modulators 3 and 5 to a radio receiver 7. This arrangement is described in detail in U. S. Patent 2,208,378 which issued to D. G. C. Luck and is assigned to the same assignee as the instant application. A centrally located antenna C is provided for sense determination and is connected to the receiver 7 through a modulating amplifier 9.

The control station equipment includes a facsimile recorder 11, which may be of the type described in U. S. application Ser. No. 420,917, filed November 29, 1941, by C. J. Young. A motor 13 is arranged to drive the recorder 11, and also a pair of commutator devices 15 and 17. The commutator 15 may be driven directly from the motor 13 at a relatively high speed, and the commutator 17 is driven through a gear reduction 19 at a relatively low speed. A direct current source 23 is connected to the commutators 15 and 17, which are provided with a plurality of separate circuit making and breaking devices, connected between the direct current source 23 and a mixer 67, through wires 25 and 30. The commutators 15 and 17 may be photoelectric to avoid contact troubles.

A second direct current source 21 is connected through separate circuit making and breaking means on the commutator device 15 to filters 69 and 71. The output of the filter 69 is supplied through a phase adjuster 73 and an amplitude adjuster 75 to a line 77 leading to the modulation input circuit of the balanced modulator 5 at the remote direction finder station 1. The output of the filter 71 is similarly applied through a phase adjuster 79, an amplitude adjuster 81, and line 83 to the modulation input circuit of the balanced modulator 3.

The two circuits from the filters 69 and 71 are also connected through amplitude adjusters 85 and 87 to a mixer 89. The devices 85 and 87 are arranged to control over a negative as well as a positive range, i. e. the output may be varied from $+e$, through zero, to $-e$. This is accomplished by any well known means, such as a bridge circuit. The output of the mixer 89 is applied to the modulated amplifier 9 at the remote station. This may be accomplished without additional lines by the phantom connection through balanced transformers 91, 93, 95 and 97, as illustrated.

The output of the receiver 7 of the direction finder 1 is conducted over a line 33 to the control station. The other remote stations are similarly connected to lines 35 and 37. The line 33 is connected through a filter 39 to an impulse generator 41, which may be of the type described in U. S. Patent No. 2,188,611 which issued to L. E. Norton and is assigned to the same assignee as the instant application. The line 35 is connected through a filter 43 and phase shifters 45 and 47 to impulse generators 49 and 51, as shown. The line 37 is connected through a filter 53 to an impulse generator 55, and through phase shifters 57 and 59 to impulse generators 61 and 63, respectively. The outputs of all of the impulse generators are applied to a mixer 65. The output of the mixer 65 is connected, together with that of the mixer 67, to the printer circuit of the recorder 11.

The adjustment and operation of the system is as follows: By way of example, the motor 13 is run at 1200 R. P. M., driving the recorder 11 to provide one scanning stroke per revolution (i. e., 20 strokes per second) and a paper feed rate of 36 centimeters per hour. The commutator 15 is driven directly by the motor 13 and, in addition to other functions described below, breaks up the voltage from the source 21 into two 20 cycle per second square wave trains which are delivered on the leads 31 and 32 in quadrature phase. The filters 69 and 71 remove the harmonic components of the square waves providing substantially sinusoidal waves to the phase adjusters 73 and 79, respectively. The devices 73 and 79 are manually adjusted to provide exact quadrature relationship between the two wave trains, and the amplitude controls 75 and 81 are adjusted to make the two waves equal in amplitude. The balanced modulators 3 and 5 are controlled by the respective 20 cycle per second waves to provide the effect of a single unidirectional antenna rotating at 20 revolutions per second, as described in the aforementioned Luck Patent 2,208,378.

In order to compensate small errors due to non-opposed antenna sensitivity zeros, the sense antenna C is connected to the receiver 7 through an amplifier 9 which can be modulated. The amplitude reversible adjusters 85 and 87 are arranged to apply a portion of each of the quadrature 20 cycle waves to the mixer 89, the output of which modulates the amplifier 9. Thus by adjustment of the devices 85 and 87 the output of the antenna C may be modulated to the proper depth and in the proper phase to correct the above errors.

In response to a wave arriving at the antenna system, the receiver 7 produces a 20 cycle wave, related in phase with respect to a fixed phase reference such as the phase of the 20 cycle output of the filter 69, by an angle equal to the azimuth of arrival of the wave with respect to a direction of reference such as the line between the antennas N and S. The output of the receiver 7 is applied to the filter 39 to remove any signal modulation other than the 20 cycle pattern rotation component. The impulse generator 41 is controlled by the 20 cycle wave to provide an impulse train in phase with, for example, the peaks of the 20 cycle wave. This impulse train passes through the mixer 65 and actuates the facsimile recorder 11 to produce a dot on the record each time the direction finder 1 scans past the line of signal arrival. The scanning drum of the recorder is operating at 1200 R. P. M. or 20 times per second; hence one dot is recorded during each scanning cycle. Successive dots will define a line on the record, in a position corresponding to the azimuth. A typical indication 105 is shown on the record illustrated in Fig. 2.

In a similar manner, the outputs of the other remote direction finders are filtered at 43 and 53. The output of the filter 43 is applied to the phase shifters 45 and 47, which are arranged to provide small equal and opposite phase shifts. The impulse generators 49 and 51 are controlled by the shifted waves to provide pulses before and after the peak of the 20 cycle wave on the line 35. The resulting facsimile record comprises a double line, as illustrated by the indication 101 shown in Fig. 2. The center of the space between the two lines corresponds to the bearing.

The indication 103 is derived from the third direction finder in a similar manner by means of the phase shifters 57 and 59 and the impulse generators 55, 61 and 63. In this case the central line corresponds to the peak of the 20 cycle wave, and is derived from the impulse generator 55 which is controlled directly by the output of the filter 53.

To avoid errors due to paper shrinkage and slip, as well as to save on paper cost, both the bearing and time scales may be recorded as the paper passes through the machine. Scale marking voltages are derived from the source 23 by the commutator devices 15 and 17, which may be arranged to break up the direct voltage of the source 23 to provide impulse trains as shown in the following tables:

*High speed commutator 15*

| Repetition frequency, cycles/sec. | Pulse duration, milliseconds | Purpose |
| --- | --- | --- |
| 80 | 0.1 | Mark 90° lines. |
| 240 | 0.1 | Mark 30° lines—omits every third pulse. |
| 720 | 0.1 | Mark 10° lines—omits every third pulse. |
| 300 | Square wave | Break 5 minute timing lines into dashes. |
| 900 | do | Break 1 minute timing lines into dots. |

*Low speed commutator 17*

| Repetition period, minutes | Pulse duration, milliseconds | Purpose |
| --- | --- | --- |
| 15 | 50 | Mark quarter hour lines. |
| 5 | 50 | Mark 5 minute lines—omits every third pulse. |
| 1 | 50 | Mark 1 minute lines—omits every fifth pulse. |
| 1 | Square wave | Break 30° lines into dashes. |
| ½ | do | Break 10° lines into dots. |

All of the above impulse trains are combined in the mixer 67 and applied to the printer circuit of the recorder 11. The resulting markings are illustrated in Fig. 2, where the 1 minute timing lines and the ten degree bearing lines are shown only in the rectangle between the 0435 and 0440 time lines and the 210° to 270° bearing lines, although actually these lines are to be recorded over the entire sheet.

To provide a periodic check of the accuracy of the system, a plurality of small local oscillators may be arranged at cardinal and primary intercardinal points around each receiver and clock controlled to transmit at predetermined times. The resulting indications on the record are shown at 107 (Fig. 2).

The indications obtained from different types of signals are shown by the record of Fig. 2. The indication 103 represents a steady bearing. The blurred, variable width indication 105 is the result of an indefinite or rapidly swinging bearing. The indication 101 is typical of a slowly swinging bearing.

Under some circumstances a permanent record of bearings may not be required. Fig. 3 illustrates a system for indicating simultaneously on the screen of a single cathode ray tube the bearings taken from a plurality of remote direction finders. The remote direction finders 102, 104, and 106 are similar to the direction finder 1 of Fig. 1. The control systems 108, 109 and 111 are likewise similar to the control system shown in Fig. 1. The phase shifters, impulse generators, and the mixer 65, are all identical with the corresponding components of the system of Fig. 1, and are designated by similar reference numerals. The indicator comprises a cathode ray tube 113, provided with the usual vertical and horizontal deflection means 115 and 117, and a radial pair of deflection electrodes 119. The electrodes 119 are connected to the output of the mixer 65.

An impulse generator 121 is connected through a switch 123 to the input of the mixer 65. The generator 121 is connected also to an eight to one frequency divider 125, which may be a counter circuit or a multivibrator. The output of the device 125 is connected to control a square wave generator 127, which is connected through a filter 129 and a 90° phase shifter 131 to the remote direction finder control circuits 108, 109 and 111, and to a deflection control circuit 133. The circuit 133 includes amplitude controls arranged to enable adjustment of the deflection and bias voltages applied to the deflection means 115 and 117 to produce circular scanning of the cathode ray beam of the tube 113.

The operation and adjustment of the system is similar to that of the system of Fig. 1, except for the derivation of the control voltages and the deflection control. The impulse generator 121 is used as a source, rather than a lower frequency sine wave generator, for the calibration of the deflection circuits. The frequency divider 125, square wave generator 127, and filter 129 cooperate in well known manner to provide a sine wave subharmonically related in frequency to the output of the impulse generator 121. The sine wave output of the phase shifter 131 is used to provide rotation of the directive patterns of the direction finders, as described in the aforementioned Luck Patent No. 2,208,378 and also to rotate the beam of the cathode ray tube 113 in synchronism with the pattern rotation. The single impulse from the direction finder 102 produces a single peaked radial deflection 141 on the screen, and the direction finders 104 and 106 produce double and triple peaked deflections 139 and 137 respectively.

Scale markings 135 may be produced on the face of the tube 113 for comparison with a fixed scale for calibration, by closing the switch 123, connecting the generator 121 to the mixer 65 and thence to the radial deflection electrode 119. The lines 135 will appear at spaced points around the circumference of the scanning trace, representing equal angular divisions of the 360° trace. The number of divisions is equal to the ratio of the frequency divider 125, which will normally be 8.

I claim as my invention:

1. A system for recording the time and origin of radio transmission including a facsimile recorder, a motor arranged to drive said recorder, means for producing alternating current synchronous with the scanning of said recorder, a plurality of antenna arrays at spaced points, means associated with each of said arrays for providing a rotating directive pattern in response to said alternating current, a receiver connected to each of said arrays so as to provide an output related in phase to said alternating current in accordance with the direction of wave arrival, means for producing impulses in response to the output of each of said receivers, of characteristics distinguishable from the impulses produced in response to the output of each of the others of said receivers; means operated by said driving motor for producing time and azimuth reference impulses, and means for actuating said recorder in response to all of said impulses.

2. A direction finding system comprising a control station and a plurality of direction finder stations at different locations, a recorder and a source of reference phase alternating current at said control station, means for supplying said reference phase alternating current to each of said direction finder stations, means at each of said direction finder stations for producing in response to an arriving wave an alternating current related in phase to said reference phase current in accordance with the azimuth of arrival of said wave, and means for actuating said recorder in response to the alternating current produced at each of said direction finder stations.

3. A direction finding system including a plurality of differently located direction finders each comprising means for producing in response to an arriving wave a train of sine waves related in timing to the azimuth of arrival of said wave at said direction finder, means for supplying all of said sine wave trains to a common control station, and means responsive to said wave trains to provide distinctive azimuth indications at said control station, said last mentioned means including a plurality of groups of impulse generators, each group being connected to respond to the wave train produced by one of said direction finders, phase shifting means connected between certain of said impulse generators and the corresponding direction finders, said phase shifting means being adjusted so that the outputs of the different direction finders produce trains of groups of different numbers of impulses.

4. A radio direction finding system comprising a plurality of direction finders, each arranged to produce, in response to an arriving wave, a sinusoidal voltage related in phase to the azimuth of arrival of said wave at said direction finder; an impulse generator connected to the output of one of said direction finders to produce a train of single impulses in response thereto, two other impulse generators connected to the output of another of said direction finders through differently adjusted phase shifters to produce a train of double impulses in response thereto, and three other impulse generators connected to the output of a third of said direction finders, two of said last mentioned impulse generators being connected to said third direction finder through differently adjusted phase shifters and the third of said impulse generators being connected directly to said third direction finder, to produce a train of triple impulses in response thereto.

DAVID G. C. LUCK.

REFERENCES CITED

The following references are of record in the file of this patent:

UNITED STATES PATENTS

| Number | Name | Date |
| --- | --- | --- |
| 1,115,530 | Hammond | Nov. 3, 1914 |
| 2,214,342 | Neufeld | Sept. 10, 1940 |